(12) United States Patent
Jackson et al.

(10) Patent No.: US 10,017,104 B2
(45) Date of Patent: Jul. 10, 2018

(54) HEADLIGHT SYSTEM FOR AN OFF-ROAD VEHICLE

(71) Applicant: CNH Industrial America LLC, New Holland, PA (US)

(72) Inventors: Dwayne St. George Jackson, Plainfield, IL (US); Jonathan Eziquiel-Shriro, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 294 days.

(21) Appl. No.: 14/741,210

(22) Filed: Jun. 16, 2015

(65) Prior Publication Data
US 2016/0368411 A1    Dec. 22, 2016

(51) Int. Cl.
| F21V 29/00 | (2015.01) |
| F21S 8/10 | (2006.01) |
| F21V 11/00 | (2015.01) |
| F21V 21/00 | (2006.01) |
| B60Q 1/00 | (2006.01) |
| B60Q 3/00 | (2017.01) |
| B60Q 1/18 | (2006.01) |

(Continued)

(52) U.S. Cl.
CPC ......... *B60Q 1/0041* (2013.01); *B60Q 1/0035* (2013.01); *B60Q 1/04* (2013.01); *B60Q 1/18* (2013.01); *B60Q 1/24* (2013.01)

(58) Field of Classification Search
CPC ...... B60Q 1/0041; B60Q 1/0035; B60Q 1/04; B60Q 1/24; B60Q 1/18; B60Q 1/0029; B60Q 1/02; B60Q 1/0408; F21W 2101/02; F21S 48/10
See application file for complete search history.

(56) References Cited

U.S. PATENT DOCUMENTS

| 1,795,614 A | 3/1931 | Morgan |
| 1,961,836 A * | 6/1934 | Warner .................... B60Q 1/24 |
| | | 362/517 |

(Continued)

FOREIGN PATENT DOCUMENTS

| DE | 102007060399 | 6/2009 |
| DE | 102010027415 | 1/2012 |
| GB | 352130 | 7/1931 |

OTHER PUBLICATIONS

U.S. Appl. No. 29/530,431, filed Jun. 16, 2015, Dwayne St. George Jackson.

*Primary Examiner* — Erin Kryukova
(74) *Attorney, Agent, or Firm* — Rickard K. DeMille; Rebecca L. Henkel

(57) ABSTRACT

A headlight system for an off-road vehicle includes a first headlight assembly configured to be disposed proximate to a first lateral side of the off-road vehicle and a second headlight assembly configured to be disposed proximate to a second lateral side of the off-road vehicle. Each of the first and second headlight assemblies includes a frame, a first headlight oriented along a first axis, a second headlight configured to direct light along a second axis that is oriented at a first angle relative to the first axis, and a third headlight configured to direct light along a third axis that is oriented at a second angle relative to the first axis. The first and second headlight assemblies are configured to illuminate more than a 180 degree arc about a forward end of the off-road vehicle while mounted to the off-road vehicle.

17 Claims, 5 Drawing Sheets

(51) Int. Cl.
  *B60Q 1/24*  (2006.01)
  *B60Q 1/04*  (2006.01)

(56) References Cited

U.S. PATENT DOCUMENTS

| | | | |
|---|---|---|---|
| 3,759,084 | A | 9/1973 | Plewka |
| 6,447,152 | B1 | 9/2002 | Goebert |
| 7,059,754 | B2 | 6/2006 | Lekson et al. |
| 7,070,310 | B2 | 7/2006 | Pond et al. |
| 7,387,417 | B2 | 6/2008 | Sazuka et al. |
| 7,641,372 | B2 * | 1/2010 | Panopoulos ............ B60Q 1/12 362/473 |
| 8,393,768 | B2 | 3/2013 | Lee et al. |
| 2002/0015308 | A1 * | 2/2002 | Naganawa ............... B60Q 1/12 362/464 |
| 2005/0010348 | A1 * | 1/2005 | Panopoulos ............ B60Q 1/12 701/49 |
| 2005/0180139 | A1 * | 8/2005 | Takeda ................... B60Q 1/12 362/276 |
| 2005/0185413 | A1 * | 8/2005 | Martoch ............... B60Q 1/0041 362/487 |
| 2014/0192548 | A1 | 7/2014 | Kracker et al. |
| 2015/0042224 | A1 * | 2/2015 | Stout ..................... B60Q 1/10 315/82 |
| 2016/0152278 | A1 * | 6/2016 | Kawashiri ............ B60Q 1/0035 180/89.1 |

* cited by examiner

HEADLIGHT SYSTEM FOR AN OFF-ROAD VEHICLE

BACKGROUND

The present application relates generally to headlight systems, and more specifically, to a headlight system for an off-road vehicle.

Off-road vehicles, such as trucks, tractors, combines, and other specialized vehicles for use in various applications typically include headlights that illuminate the ground in front of the vehicle. However, typical headlights for off-road vehicles may not adequately illuminate the ground surrounding the off-road vehicle. For example, many obstacles, such as uneven surfaces and/or rocks, may be present in the challenging environments in which such vehicles operate. These obstacles may not be adequately illuminated by typical headlights, and thus, may be difficult for the operator to see.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In a first embodiment, a headlight system for an off-road vehicle includes a first headlight assembly configured to be disposed proximate to a first lateral side of the off-road vehicle and a second headlight assembly configured to be disposed proximate to a second lateral side of the off-road vehicle. Each of the first and second headlight assemblies includes a frame, a first headlight coupled to the frame, a second headlight coupled to the frame on a first side of the first headlight, and a third headlight coupled to the frame on a second side of the first headlight, opposite the first side. The first headlight has a first light source, and the first headlight is oriented along a first axis. The second headlight has a second light source, the second headlight is configured to direct light along a second axis oriented at a first angle relative to the first axis, and the first angle is greater than approximately 10 degrees. The third headlight has a third light source, the third headlight is configured to direct light along a third axis oriented at a second angle relative to the first axis, and the second angle is greater than approximately 10 degrees. The first and second headlight assemblies are configured to illuminate more than a 180 degree arc about a forward end of the off-road vehicle while the first and second headlight assemblies are mounted to the off-road vehicle.

In a second embodiment, a headlight system for an off-road vehicle includes a first headlight assembly having a frame, a first headlight coupled to the frame and oriented along a first axis, a second headlight coupled to the frame and configured to be positioned between a medial plane of the off-road vehicle and the first headlight while the first headlight assembly is mounted to the off-road vehicle, and a third headlight coupled to the frame and configured to be positioned laterally outward from the first headlight while the first headlight assembly is mounted to the off-road vehicle. The second headlight comprises a second axis, and the second axis is oriented at a first angle relative to the first axis. The third headlight comprises a third axis, the third axis is oriented at a second angle relative to the first axis, and the second angle is less than the first angle.

In a third embodiment, an off-road vehicle includes a first headlight assembly having a frame, a first headlight coupled to the frame and configured to direct light along a first axis to a first area forward of the off-road vehicle, and a second headlight coupled to the frame between a medial plane of the off-road vehicle and the first headlight. The second headlight includes a second axis oriented at a first angle relative to the first axis, and the second headlight is configured to direct light across the first axis to a second area laterally outward of the off-road vehicle.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments disclosed herein relate generally to headlight systems for off-road vehicles (e.g., agricultural vehicles). The disclosed headlight systems include at least two headlight assemblies configured to be positioned proximate to a forward end of the off-road vehicle. Each headlight assembly includes multiple headlights each having a light source and a reflector, and each headlight assembly is configured to provide light to a forward region and to a side region around the vehicle. Accordingly, each headlight assembly may illuminate (e.g., distribute light along) more than a 90 degree arc about the forward end of the vehicle, and the headlight system may illuminate more than a 180 degree arc about the forward end of the off-road vehicle. The headlight system disclosed herein provides a compact system that illuminates the ground surrounding the forward end of the off-road vehicle, thereby increasing operator visibility and operational efficiency, for example.

Figure 1:
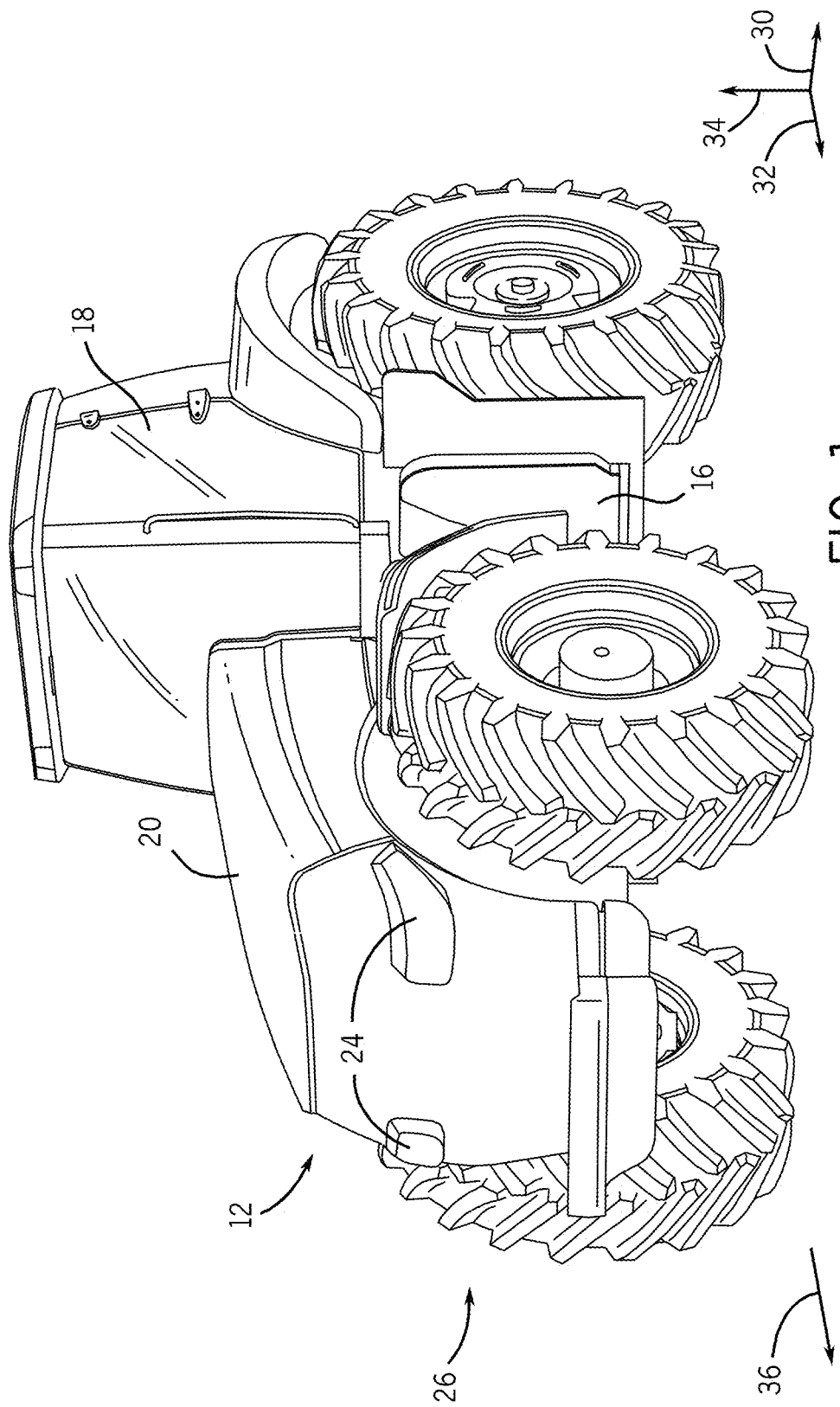
FIG. 1 is a perspective view of an embodiment of an off-road vehicle having a headlight system with two headlight assemblies.

With the foregoing in mind, FIG. 1 is a perspective view of an embodiment of an off-road vehicle 10 having a headlight system 12. In the illustrated embodiment, the vehicle 10 includes a body 16 and a cabin 18 in which an operator may sit or stand to operate the vehicle 10. The body 16 includes a hood 20 that may house an internal combustion engine, a transmission, and/or a power train for driving one or more wheels 22, for example. The headlight system 12 may include one or more headlight assemblies 24 disposed at a forward end 26 (e.g., forward portion or front portion) of the vehicle 10 relative to the direction of travel 36. In the illustrated embodiment, the headlight system 12 includes two headlight assemblies 24 positioned on generally opposite lateral sides of the hood 20. As illustrated, the headlight system 12 includes a left headlight assembly 24 positioned proximate to a left side of the hood 20 and a right headlight assembly 24 positioned proximate to a right side of the hood 20. As discussed in more detail below, each headlight assembly 24 may be configured to illuminate more than a 90 degree arc about the forward end 26 of the vehicle 10, and/or the headlight system 12 may be configured to illuminate more than a 180 degree arc about the forward end 26 of the vehicle 10. While a 90 degree arc is disclosed below to facilitate discussion, in some embodiments, each headlight assembly 24 may be configured illuminate more than a 95, 100, 105, 110, 115, 120, or 125 degree arc about the forward end 26 of the vehicle 10. In some embodiments, each headlight assembly 24 may be configured illuminate an arc extending approximately 95-125, 100-120, 105-115, or 100-120 degrees about the forward end 26 of the vehicle 10. Furthermore, while a 180 degree arc is disclosed below to facilitate discussion, in some embodiments, the headlight system 12 may be configured illuminate more than a 185, 190, 195, 200, 205, 210, 215, or 225 degree arc about the forward end 26 of the vehicle 10. In some embodiments, the headlight system 12 may be configured illuminate an arc extending approximately 185-225, 190-215, 195-210, or 200-205 degrees about the forward end 26 of the vehicle 10.

The vehicle 10 and/or the headlight assemblies 24 may be further defined as having a lateral axis 30, a longitudinal axis 32, and a vertical axis 34. Additionally, the vehicle 10 may travel in a forward direction 36 (e.g., direction of travel). In the illustrated embodiment, the vehicle 10 is an agricultural tractor. However, any suitable agricultural or off-road vehicle, including self-propelled vehicles, sprayers, combines, trucks, and so forth may utilize aspects of the disclosed embodiments. It should be understood that in some vehicles, the wheels 22 may be replaced with tracks or other drive systems.

Figure 2:
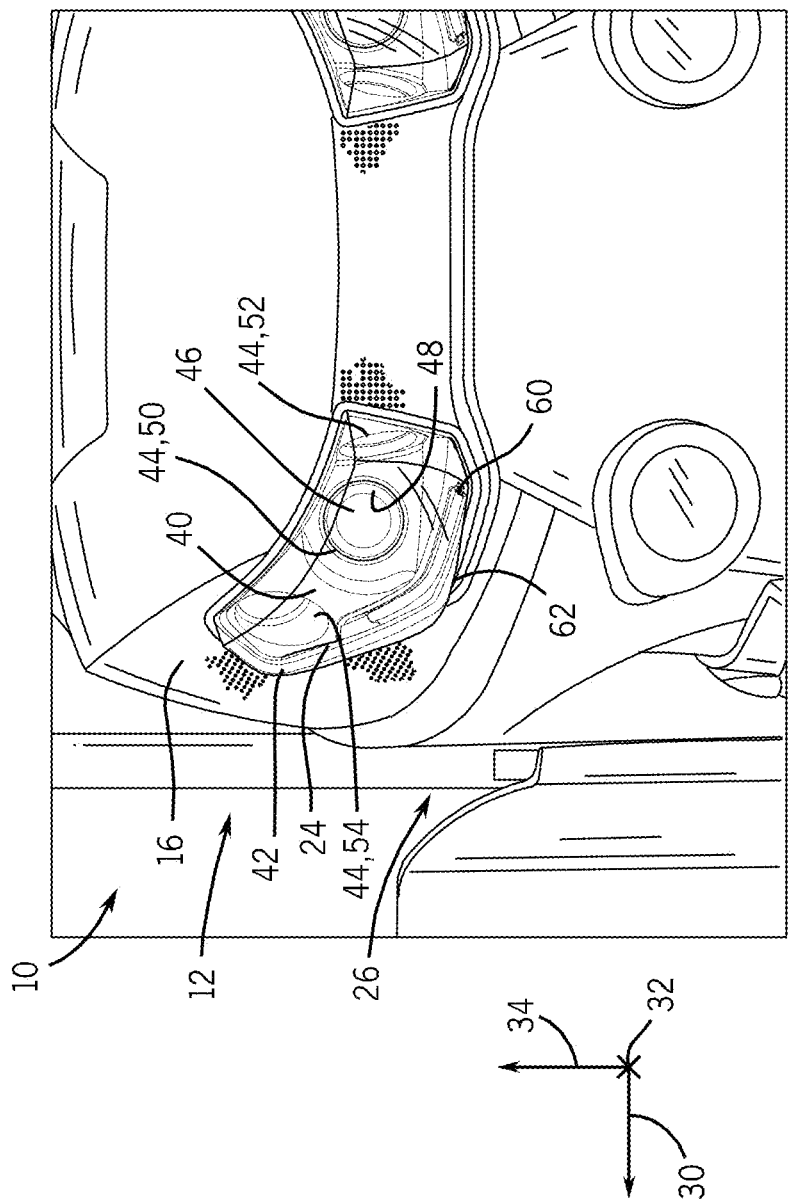
FIG. 2 is a perspective view of an embodiment of one headlight assembly coupled to the off-road vehicle of FIG. 1.

FIG. 2 is a perspective view of an embodiment of one headlight assembly 24 coupled to the vehicle 10 of FIG. 1. As shown, the headlight assembly 24 includes a lens 40 (e.g., a transparent cover) configured to cover and/or protect multiple headlights 44 and a frame 42 (e.g., bezel or support structure) configured to support the multiple headlights 44. In the illustrated embodiment, each headlight 44 includes a light source 46 and a reflector 48 configured to reflect and to focus/direct the light emitted by the light source 46. In certain embodiments, one or more of the headlights 44 may include multiple light sources 46 and/or may not include the reflector 48. As shown, the headlight assembly 24 includes three headlights 44: a center headlight 50 (e.g., a first headlight), a medial headlight 52 (e.g., a second headlight configured to be positioned laterally inward from the center headlight 50 and/or to be positioned between the center headlight 50 and a medial plane of the vehicle 10, where the medial plane is a vertical plane along a midline of the off-road vehicle 10), and a lateral headlight 54 (e.g., a third headlight, configured to be positioned laterally outward from the center headlight 50 and/or from the medial headlight 52). When mounted to the vehicle 10, the headlights 44 may be laterally, longitudinally, and/or vertically offset relative to one another. For example, in the illustrated embodiment, at least a portion of the third headlight 54 is positioned vertically above the center headlight 50 and/or the medial headlight 52 (e.g., along the vertical axis 34). In addition, in the illustrated embodiment, the medial headlight 52 is positioned longitudinally forward of the center headlight 50 and/or the lateral headlight 54 (e.g., along the longitudinal axis 32). In certain embodiments, the headlights 44 may be positioned in any of a variety of manners relative to one another.

The headlight assembly 24 may be positioned relative to the vehicle 10 to facilitate illumination of more than a 90 degree arc about the forward end 26 of the vehicle 10. Thus, two headlight assemblies 24, as disclosed herein, may together illuminate more than a 180 degree arc about the forward end 26 of the vehicle 10. In the illustrated embodiment, the center headlight 50 is generally oriented along (e.g., aligned with) the longitudinal axis 32 of the vehicle 10 and/or may be configured to direct light generally in the direction of travel 36 of the vehicle 10. Additionally, the medial headlight 52 is oriented at a first angle relative to the longitudinal axis 32 of the vehicle 10 and/or is configured to direct light laterally outward from the vehicle 10. Furthermore, the lateral headlight 54 is oriented at a second angle relative to the longitudinal axis 32 of the vehicle 10, different (e.g., greater or less than) the first angle, and/or is configured to direct light to an intermediate region between the light emitted from the center headlight 50 and the light emitted from medial headlight 52.

In some embodiments, when the headlight assembly 24 is mounted to the vehicle 10, one or more of the headlights may be oriented to direct a portion of the light vertically downward (e.g., along the vertical axis 34). In the illustrated embodiment, the center headlight 50 is configured to direct light along the longitudinal axis 32 of the vehicle 10 or along an axis lying within a longitudinal plane of the vehicle 10. In certain embodiments, one or more of the center headlight 50, the medial headlight 52, and the lateral headlight 54 may be oriented at respective angles (e.g., between approximately 5-70, 10-50, or 20-40 degrees) relative to the longitudinal plane of the vehicle 10 to direct light toward the ground surrounding the vehicle 10, for example. In some embodiments, the center headlight 50 may be oriented at a first angle relative to the longitudinal plane, the medial headlight 52 may be oriented at a second angle relative to the longitudinal plane, and the lateral headlight 54 may be oriented at a third angle relative to the longitudinal plane to facilitate enhanced illumination of the ground surrounding the forward end 26 of the vehicle 10. It should be understood that the headlight assembly 24 may be mounted to the vehicle 10 in any suitable manner and/or in any suitable orientation to enable illumination of more than a 90 degree arc about the forward end 26 of the vehicle 10.

In the illustrated embodiment, the headlight assembly 24 also includes a fourth light source 60 disposed generally vertically below the center headlight 50. The fourth light source 60 extends laterally across at least a portion of the headlight assembly 24. In some embodiments, the fourth light source 60 may be positioned proximate to a bottom edge 62 of the frame 42 and/or may extend laterally across at least 10, 20, 30, 40, 50, 60, 70, 80, 90 or more percent of the frame 42. The fourth light source 60 may be configured to provide additional illumination about the forward end 26 of the vehicle 10. In some embodiments, the fourth light source 60 may be a fog light configured to selectively provide white or yellow light during reduced visibility conditions.

Figure 3:
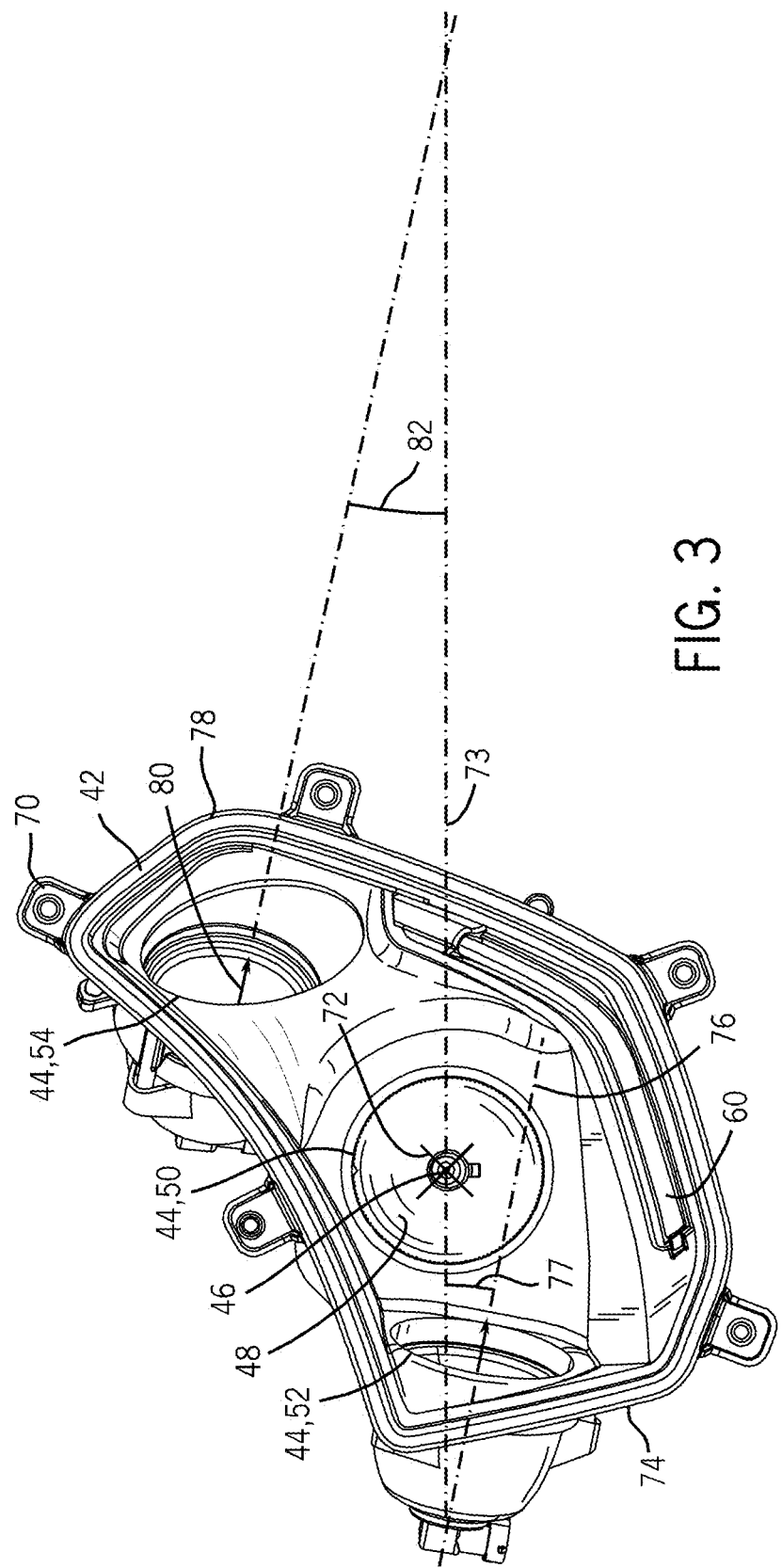
FIG. 3 is a front view of the headlight assembly of FIG. 2.

FIG. 3 is a front view of the headlight assembly 24. The headlight assembly 24 includes the frame 42 configured to support the center headlight 50, the medial headlight 52, and the lateral headlight 54. Each headlight 44 includes the at least one light source 46 and the reflector 48 configured to reflect and to focus/direct light emitted by the light source. In some embodiments, the reflector 48 is integrally formed on the frame 42. Brackets 70 extend from the frame 42 and are configured to facilitate coupling of the headlight assembly 24 to the vehicle 10. In other embodiments, the frame 42 may be coupled to the vehicle 10 via any suitable coupling system.

As shown, a first longitudinal axis 72 extends through the center headlight 50, and the center headlight 50 is configured to emit/direct light in a first direction (e.g., centered about the first longitudinal axis 72). The first longitudinal axis 72 lies within a first plane 73, which may be generally parallel to the ground when the headlight assembly 24 is coupled to the vehicle 10. The medial headlight 52 is disposed proximate to a first edge 74 of the frame 42. A second longitudinal axis 76 extends through the medial headlight 52. The medial headlight 52 is configured to emit/direct light in a second direction (e.g., centered about the second longitudinal axis 76). In the illustrated embodiment, the second longitudinal axis 76 is oriented at a first angle 77 relative to the first plane 73. The lateral headlight 54 is disposed proximate to a second edge 78 of the frame 42. A third longitudinal axis 80 extends through the lateral headlight 54. The lateral headlight 54 is configured to emit/direct light in a third direction (e.g., centered about the third longitudinal axis 80). In the illustrated embodiment, the third longitudinal axis 80 is oriented at a second angle 82 relative to the first plane 73. The first angle 77 and the second angle 82 may be the same or different from one another, and may be between approximately 5-70, 10-50, or 20-40 degrees. The first angle 77 and the second angle 82 may be any suitable angle to facilitate illumination of the ground about the forward end 26 of the vehicle 10, while the headlight assembly 24 is mounted to the vehicle 10.

Figure 4:
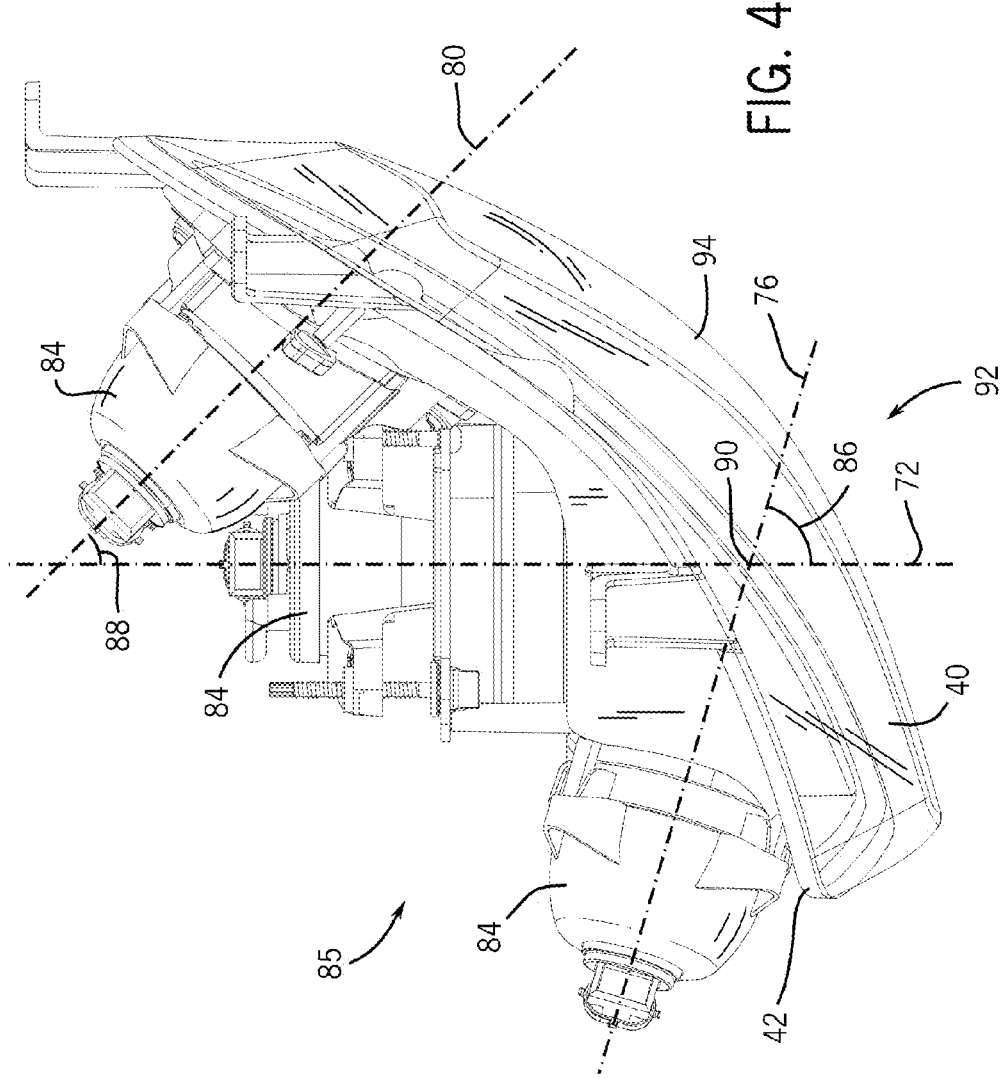
FIG. 4 is a top view of the headlight assembly of FIG. 2.

FIG. 4 is a top view of the headlight assembly 24. The top view illustrates relative positions and orientations of the center headlight 50, the medial headlight 52, and the lateral headlight 54 within the frame 42. Each of the headlights is supported by a respective housing 84 disposed on a back side 85 of the headlight assembly 24 and coupled to or integrated with the frame 42. As shown, the center headlight 50 is oriented along the first longitudinal axis 72, the medial headlight 52 is oriented along the second longitudinal axis 76, and the lateral headlight 54 is oriented along the third longitudinal axis 80. The second longitudinal axis 76 is oriented at a third angle 86 relative to the first longitudinal axis 72. The third angle 86 may be any suitable angle to enable the headlight assembly 24 to illuminate more than a 90 degree arc about the forward end 26 of the vehicle 10, while the headlight assembly 24 is mounted to the vehicle 10. For example, the third angle 86 may be greater than approximately 10, 20, 30, 40, 50, 60, 70, 80, 90, 100 or more degrees. In some embodiments, the third angle 86 may be between 10-100, 20-90, 30-80, or 40-70 degrees.

The third longitudinal axis 80 is oriented at a fourth angle 88 relative to the first longitudinal axis 72. The fourth angle 88 may be any suitable angle to enable the headlight assembly 24 to illuminate more than a 90 degree arc about the forward end 26 of the vehicle 10, while the headlight assembly 24 is mounted to the vehicle 10. For example, the fourth angle 88 may be greater than approximately 10, 20, 30, 40, 50, 60, 70, 80, 90, 100 or more degrees. In some embodiments, the fourth angle 88 may be between 10-100, 20-90, 30-80, or 40-70 degrees. In the illustrated embodiment, the fourth angle 88 is less than the third angle 86. However, in other embodiments, the fourth angle 88 may be greater than the third angle 86.

The first longitudinal axis 72 and the second longitudinal axis 76 are oriented to converge and/or to intersect at a point 90 located forward of the center headlight 50 and forward the medial headlight 52 (e.g., proximate to a front side 92 of the headlight assembly 24). In some embodiments, the point 90 may be located within the headlight assembly 24 (e.g., within the cover 40) or within 2, 5, 8, 10, or 15 centimeters (cm) of an outer surface 94 of the cover 40. In some embodiments, the first longitudinal axis 72 and the third longitudinal axis 80 may be oriented to diverge within a region forward of the center headlight 50 and forward of the lateral headlight 54 (e.g., within a region proximate to the front side 92 of the headlight assembly 24). In the illustrated embodiment, the second longitudinal axis 76 and the third longitudinal axis 80 are oriented to converge within a region forward of the medial headlight 52 and forward of the lateral headlight 54 (e.g., within a region proximate to the front side 92 of the headlight assembly 24).

In some embodiments, when the headlight assembly 24 is mounted to the vehicle 10, as discussed above with respect to FIG. 2, the first longitudinal axis 72 may be generally aligned with the longitudinal axis 32 of the vehicle 10 and/or may be oriented to direct light in the direction of travel 36. Thus, in such cases, the second longitudinal axis 76 may be oriented at the third angle 86 relative to the longitudinal axis 32 of the vehicle 10, and the third longitudinal axis 80 may be oriented at the fourth angle 88 relative to the longitudinal axis 32 of the vehicle 10.

Figure 5:
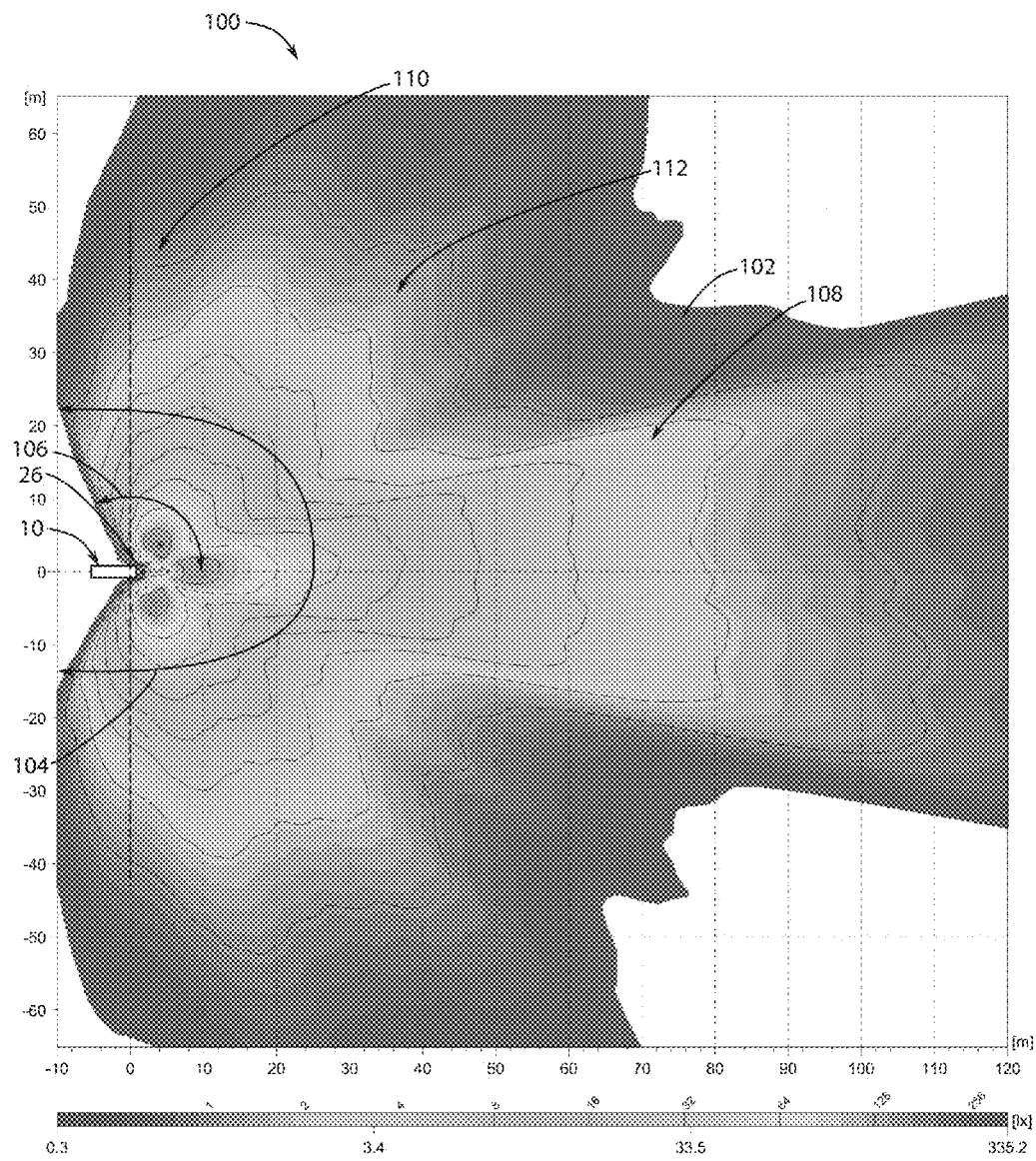
FIG. 5 is an example of a graph of a distribution of light emitted by the headlight system of the off-road vehicle of FIG. 1.

FIG. 5 is an example of a graph 100 of a distribution of light 102 emitted by the headlight system 12 of the vehicle 10. The graph 100 includes a schematic, top-view of the vehicle 10. As shown, the light 102 emitted from the headlight system 12 of the vehicle 10 may illuminate a region 104 that extends more than 180 degrees about the forward end 26 of the vehicle 10. In some embodiments, the headlight system 12 may be configured to illuminate a region 104 that extends more than 180, 185, 190, 195, 200, 205, 210, 215, or 225 degrees about the forward end of the vehicle 10. As discussed above, in some embodiments, the headlight system 12 may include multiple headlight assemblies 24. In the illustrated embodiment, the headlight system 12 includes two headlight assemblies 24 positioned on generally opposite lateral sides of the vehicle 10. Each of the headlight assemblies 24 may include one or more headlights 44 and may be configured to illuminate a region (e.g., region 106) that extends more than 90 degrees about the forward end 26 of the vehicle 10. In some embodiments, each of the headlight assemblies 24 may be configured illuminate a region that extends more than 95, 100, 105, 110, 115, 120, or 125 degrees about the forward end of the vehicle 10.

Additionally, as discussed above, each headlight assembly 24 may include multiple headlights 44. For example, each headlight assembly 24 may include the center headlight 50, the medial headlight 52, and the lateral headlight 54. With reference to FIG. 6, one headlight assembly 24 having the center headlight 50, the medial headlight 52, and the lateral headlight 54 illuminates the region that extends more than 90 degrees about the forward end 26 of the vehicle 10. In some such cases, the center headlight 50 is configured to illuminate a forward area 108 generally forward of the vehicle 10. Additionally, the medial headlight 52 is configured to illuminate a lateral area 110 generally laterally outward from the vehicle 10, and/or the lateral headlight 54 is configured to illuminate an intermediate area 112 generally between the forward area 108 and the lateral area 110. Such a configuration may increase visibility of the area surrounding the off-road vehicle, as compared to typical headlights.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A headlight system for an off-road vehicle, comprising:
   a first headlight assembly configured to be disposed proximate to a first lateral side of the off-road vehicle and a second headlight assembly configured to be disposed proximate to a second lateral side of the off-road vehicle, each of the first and second headlight assemblies comprising:
   a frame;
   a first headlight coupled to the frame, wherein the first headlight comprises a first light source, and the first headlight is configured to direct light along a first axis that is configured to be aligned with a longitudinal axis of the off-road vehicle;
   a second headlight coupled to the frame on a first side of the first headlight, wherein the second headlight comprises a second light source, the second headlight is configured to direct light along a second axis oriented at a first angle relative to the first axis, and the first angle is greater than approximately 10 degrees; and
   a third headlight coupled to the frame on a second side of the first headlight, opposite the first side, wherein the third headlight comprises a third light source, the third headlight is configured to direct light along a third axis oriented at a second angle relative to the first axis, and the second angle is greater than approximately 10 degrees;
   wherein the first and second headlight assemblies are configured to illuminate more than a 180 degree arc about a forward end of the off-road vehicle while the first and second headlight assemblies are mounted to the off-road vehicle, the second headlight of the first headlight assembly is configured to be positioned between a medial plane of the off-road vehicle and the respective first headlight, the second headlight of the first headlight assembly is configured to illuminate an area laterally outward of the off-road vehicle while the first headlight assembly is mounted to the off-road vehicle, the first headlight of the first headlight assembly lies in a first plane that is configured to be parallel to the ground, and the second axis is oriented at a third angle relative to the first plane and the third axis is oriented at a fourth angle, different than the third angle, relative to the first plane.

2. The headlight system of claim 1, wherein each of the first and second headlight assemblies are configured to illuminate more than a 115 degree arc about the forward end of the off-road vehicle.

3. The headlight system of claim 1, wherein the first angle is greater than the second angle.

4. The headlight system of claim 1, wherein the first angle and the second angle are between approximately 20 and 90 degrees.

5. The headlight system of claim 1, wherein the first axis and the second axis intersect at a point forward of a forward side of the respective headlight assembly.

6. The headlight system of claim 1, wherein the first axis extends through the first light source and a center of a reflector of the first headlight and the first headlight is configured to emit light in a first direction centered about the first axis.

7. A headlight system for an off-road vehicle, comprising:
   a first headlight assembly, comprising:
   a frame;
   a first headlight coupled to the frame and configured to direct light along a first axis that is configured to be aligned with a longitudinal axis of the off-road vehicle;
   a second headlight coupled to the frame and configured to be positioned between a medial plane of the off-road vehicle and the first headlight while the first headlight assembly is mounted to the off-road vehicle, wherein the second headlight comprises a second axis, and the second axis is oriented at a first angle relative to the first axis; and
   a third headlight coupled to the frame and configured to be positioned laterally outward from the first headlight while the first headlight assembly is mounted to the off-road vehicle, wherein the third headlight comprises a third axis, the third axis is oriented at a second angle relative to the first axis, and the second angle is less than the first angle; wherein the first headlight is configured to illuminate an area forward of the off-road vehicle, the second headlight is configured to illuminate an area laterally outward of the off-road vehicle while the first headlight assembly is mounted to the off-road vehicle, the first headlight lies in a first plane that is configured to be parallel to the ground, and the second axis is oriented at a third angle relative to the first plane and the third axis is oriented at a fourth angle, different than the third angle, relative to the first plane.

8. The headlight system of claim 7, wherein the first headlight assembly is configured to illuminate more than a 115 degree arc about a forward end of the off-road vehicle.

9. The headlight system of claim 7, comprising a second headlight assembly, wherein the first headlight assembly is configured to be disposed proximate to a first lateral side of the off-road vehicle and the second headlight assembly is configured to be disposed proximate to a second lateral side of the off-road vehicle, and each of the first headlight assembly and the the second headlight assembly is configured to illuminate more than a 90 degree arc about a forward end of the off-road vehicle.

10. The headlight system of claim 9, wherein the headlight system is configured to illuminate more than a 180 degree arc about the forward end of the off-road vehicle.

11. The headlight system of claim 7, wherein the third headlight is configured to be positioned vertically above the first plane while the first headlight assembly is mounted to the off-road vehicle.

12. The headlight system of claim 7, wherein the first headlight assembly comprises a transparent cover that covers the first headlight, the second headlight, and the third headlight, and wherein the first axis and the second axis intersect at a first point forward of the first headlight and within the transparent cover, and the second axis and the third axis intersect at a second point outside of the transparent cover.

13. An off-road vehicle, comprising:
a first headlight assembly, comprising:
   a frame;
   a first headlight coupled to the frame and configured to direct light along a first axis to illuminate a first area forward of the off-road vehicle;
   a second headlight coupled to the frame, wherein the second headlight is positioned between a medial plane of the off-road vehicle and the first headlight, and the second headlight comprises a second axis oriented at a first angle relative to the first axis, and is configured to direct light across the first axis to illuminate a second area laterally outward of the off-road vehicle; and
   a third headlight coupled to the frame, wherein the third headlight is positioned laterally outward from the first headlight, and the third headlight comprises a third axis oriented at a second angle relative to the first axis, wherein the second angle is less than the first angle, the third headlight is configured to direct light to an intermediate area between the first area forward of the off-road vehicle and the second area laterally outward of the off-road vehicle, the first headlight lies in a first plane that is configured to be parallel to the ground, and the second axis is oriented at a third angle relative to the first plane and the third axis is oriented at a fourth angle, different than the third angle, relative to the first plane.

14. The off-road vehicle of claim 13, wherein the first headlight assembly is configured to illuminate more than a 115 degree arc about a forward end of the off-road vehicle.

15. The off-road vehicle of claim 13, comprising a second headlight assembly, wherein the first and second headlight assemblies are configured to illuminate more than a 180 degree arc about a forward end of the off-road vehicle.

16. The off-road vehicle of claim 13, wherein the first axis is aligned with a longitudinal axis of the off-road vehicle.

17. The off-road vehicle of claim 13, wherein the first axis is parallel to a direction of travel of the off-road vehicle.

* * * * *